US012786856B2

(12) United States Patent
Kojima

(10) Patent No.: US 12,786,856 B2
(45) Date of Patent: Nov. 3, 2026

(54) INFORMATION PROCESSING DEVICE, CONTROL METHOD OF INFORMATION PROCESSING DEVICE, AND PROGRAM FOR ASSISTING CONNECTION SETTING USING IDENTIFICATION INFORMATION ACQUIRED FROM A WEB PAGE

(71) Applicant: SEIKO EPSON CORPORATION, Tokyo (JP)

(72) Inventor: Daiki Kojima, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 397 days.

(21) Appl. No.: 18/455,328

(22) Filed: Aug. 24, 2023

(65) Prior Publication Data

US 2024/0073795 A1 Feb. 29, 2024

(30) Foreign Application Priority Data

Aug. 25, 2022 (JP) ................................ 2022-133928

(51) Int. Cl.
*H04W 48/16* (2009.01)
*H04L 67/147* (2022.01)
*H04W 48/20* (2009.01)

(52) U.S. Cl.
CPC .......... *H04W 48/16* (2013.01); *H04L 67/147* (2013.01); *H04W 48/20* (2013.01)

(58) Field of Classification Search
None
See application file for complete search history.

(56) References Cited

U.S. PATENT DOCUMENTS 10,477,461 B2 * 11/2019 Lee ....................... H04W 48/16
2005/0265286 A1 * 12/2005 Umemura ............ H04W 76/11
455/436

(Continued)

FOREIGN PATENT DOCUMENTS

JP 2012-060476 A 3/2012
JP 2019-062326 A 4/2019

OTHER PUBLICATIONS

Setup for the ES-60WB (https://support.epson.net/setupnavi/?LG2=JA&OSC=WS&MKN=ES-60WB&PINF=setup) (1 page).

*Primary Examiner* — Jenee Holland
(74) *Attorney, Agent, or Firm* — WORKMAN NYDEGGER

(57) ABSTRACT

A control unit of an information processing device causes a touch panel to display, based on identification information of a connection device received by the touch panel, a web page related to a setting of the connection device corresponding to the identification information and related to a setting of wireless communication of a first wireless communication method, acquires the identification information of the connection device included in the web page, displays the identification information of the connection device on an application screen displayed by an application program, when the identification information displayed on the application screen is selected, detects the connection device corresponding to the identification information, and wirelessly connects to the connection device by causing a first wireless communication I/F to perform wireless communication according to the first wireless communication method.

7 Claims, 7 Drawing Sheets

1

(56) References Cited

U.S. PATENT DOCUMENTS

| | | | | |
|---|---|---|---|---|
| 2011/0228330 | A1* | 9/2011 | Nogawa | H04W 12/084 358/1.15 |
| 2013/0272224 | A1* | 10/2013 | Ogawara | H04W 12/06 370/329 |
| 2013/0295907 | A1* | 11/2013 | Sakano | H04W 48/18 455/418 |
| 2015/0072680 | A1* | 3/2015 | Ogawara | H04W 48/16 455/434 |
| 2016/0192259 | A1* | 6/2016 | Ogawara | H04W 8/005 455/436 |
| 2019/0069230 | A1* | 2/2019 | Nishida | H04W 48/18 |
| 2019/0182668 | A1* | 6/2019 | Yasukawa | H04L 63/083 |
| 2019/0306713 | A1* | 10/2019 | Yanagisawa | H04W 88/08 |
| 2019/0357030 | A1* | 11/2019 | Mihira | H04W 76/14 |
| 2020/0236737 | A1* | 7/2020 | Ye | H04W 12/06 |
| 2020/0288035 | A1* | 9/2020 | Kawana | H04N 1/00464 |
| 2022/0015170 | A1* | 1/2022 | Takeuchi | G06F 3/1292 |
| 2022/0248216 | A1* | 8/2022 | Lee | H04W 60/04 |
| 2023/0189372 | A1* | 6/2023 | Shinozuka | G06F 3/1204 370/329 |
| 2023/0269587 | A1* | 8/2023 | Fukushima | H04W 12/71 726/3 |

* cited by examiner

INFORMATION PROCESSING DEVICE, CONTROL METHOD OF INFORMATION PROCESSING DEVICE, AND PROGRAM FOR ASSISTING CONNECTION SETTING USING IDENTIFICATION INFORMATION ACQUIRED FROM A WEB PAGE

The present application is based on, and claims priority from JP Application Serial Number 2022-133928, filed Aug. 25, 2022, the disclosure of which is hereby incorporated by reference herein in its entirety.

BACKGROUND

1. Technical Field

The present disclosure relates to an information processing device, a control method of the information processing device, and a program.

2. Related Art

In the related art, there is known an information processing device that includes a first wireless communication unit corresponding to a first communication method and a second wireless communication unit corresponding to a second communication method, and performs communication with an external device by a first wireless communication method based on connection information received by the second wireless communication unit from the external device.

For example, JP-A-2019-62326 discloses a communication device including a first communication unit of a first communication method, a second communication unit of a second communication method, and a control unit that controls the first communication unit and the second communication unit. The control unit causes the first communication unit to receive connection information for connecting with an external device from a terminal device capable of performing communication connection to the external device according to the second communication method, and performs communication connection with the external device based on the connection information received by the first communication unit.

However, when the external device does not include the second wireless communication unit corresponding to the second communication method, a user needs to, for example, perform setting corresponding to the first communication method after viewing a website connection procedure guidance. Further, the user needs to activate an application program installed in the information processing device and perform additional setting of the external device in the application program, resulting in a complicated operation procedure.

SUMMARY

The present disclosure provides an information processing device including: a first wireless communication unit configured to perform wireless communication of a first wireless communication method; a display unit; a reception unit configured to receive an operation; and a control unit configured to execute an application program for controlling a connection device, in which the control unit is configured to cause the display unit to display, based on identification information of a connection device received by the reception unit, a web page related to a setting of the connection device corresponding to the identification information and related to a setting of wireless communication of the first wireless communication method, acquire the identification information of the connection device included in the web page, display the identification information of the connection device on an application screen displayed by the application program, when the identification information displayed on the application screen is selected, detect the connection device corresponding to the identification information, and wirelessly connect to the connection device by the first wireless communication method.

The present disclosure provides a control method of an information processing device, the information processing device including a first wireless communication unit configured to perform wireless communication of a first wireless communication method, a display unit, a reception unit, and a control unit configured to execute an application program, the control method including: a step of causing the display unit to display, based on identification information of a connection device received by the reception unit, a web page related to a setting of the connection device corresponding to the identification information and related to a setting of wireless communication of the first wireless communication method; a step of acquiring the identification information of the connection device included in the web page; and a step of displaying the identification information of the connection device on an application screen displayed by the application program, when the identification information displayed on the application screen is selected, detecting the connection device corresponding to the identification information, and wirelessly connecting to the connection device by the first wireless communication method.

The present disclosure provides a non-transitory computer-readable storage medium storing a program, the program being executed by an information processing device including a first wireless communication unit configured to perform wireless communication of a first wireless communication method, a display unit, a reception unit, and a control unit configured to execute an application program, the program including: a procedure of causing the display unit to display, based on identification information of a connection device received by the reception unit, a web page related to a setting of the connection device corresponding to the identification information and related to a setting of wireless communication of the first wireless communication method; a procedure of acquiring the identification information of the connection device included in the web page; and a procedure of displaying the identification information of the connection device on an application screen displayed by the application program, when the identification information displayed on the application screen is selected, detecting the connection device corresponding to the identification information, and wirelessly connecting to the connection device by the first wireless communication method.

DESCRIPTION OF EMBODIMENTS

1. System Configuration

Figure 1:
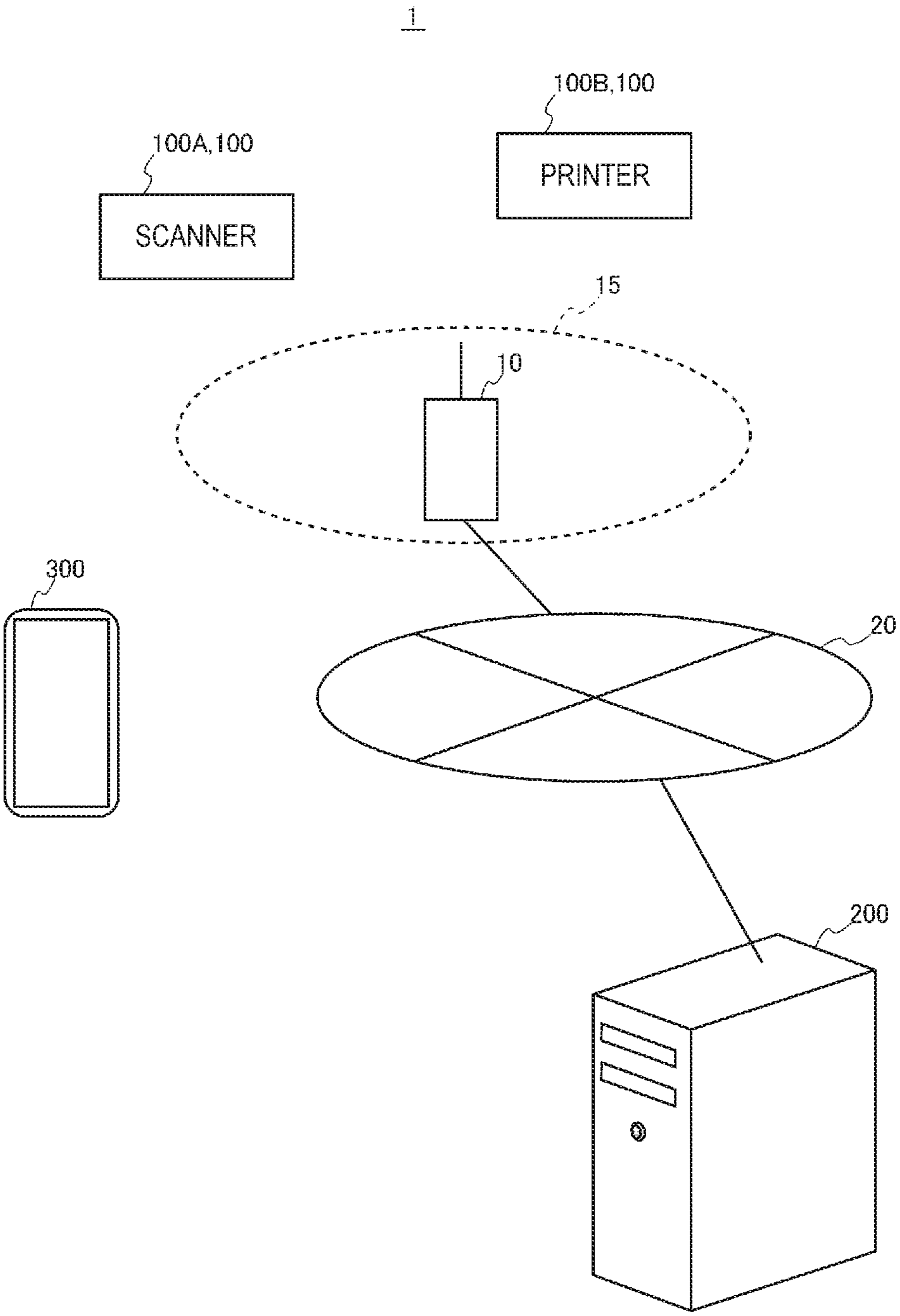
FIG. 1 is a diagram showing a system configuration.

FIG. 1 is a diagram showing a system configuration of a system 1 to which an information processing device 300 is connected. The system 1 shown in FIG. 1 includes a connection device 100, a server device 200, and the information processing device 300.

The connection device 100 and the information processing device 300 can be connected to a wireless network 15 constructed by a wireless router 10. Further, the connection device 100 and the information processing device 300 can be directly connected to each other without the wireless router 10 by wireless communication conforming to a communication standard such as Wi-Fi Direct. Wi-Fi is a registered trademark.

The wireless router 10 is connected to a global network 20 to which the server device 200 is connected. The global network 20 is, for example, a network including the Internet, a telephone network, and other communication networks.

The wireless router 10 functions as an access point and relays transmission and reception of data between devices connected to the wireless network 15. The wireless router 10 functions as a router, connects to the global network 20 via a modem (not shown), and relays transmission and reception of data between the server device 200 connected to the global network 20 and a device connected to the wireless network 15.

The connection device 100 is a processing device such as a scanner 100A that has an image reading function or a printer 100B that has an image printing function. Hereinafter, the scanner 100A and the printer 100B are collectively referred to as the connection device 100.

The embodiment describes a case in which the connection device 100 is the scanner 100A or the printer 100B, but the connection device 100 is not limited to the scanner 100A or the printer 100B, and may be any device having a wireless communication function.

The server device 200 is, for example, a device managed by a company or the like that provides the connection device 100. The server device 200 provides a website for describing a method for setting the connection device 100.

2. Configuration of Information Processing Device

A configuration of the information processing device 300 will be described with reference to FIG. 2.

The information processing device 300 is a portable computer such as a smartphone or a tablet computer.

The information processing device 300 includes a first wireless communication interface 310, a second wireless communication interface 320, an operation unit 330, a touch panel 340, and a control unit 350. Hereinafter, the interface is also referred to as an I/F.

The first wireless communication I/F 310 is an interface that includes a wireless antenna and an interface circuit and performs wireless communication with an external device including the connection device 100. The first wireless communication I/F 310 corresponds to a first wireless communication unit.

The first wireless communication I/F 310 according to the embodiment performs communication conforming to the Wi-Fi communication standard, and connects to the wireless network 15 constructed by the wireless router 10. The first wireless communication I/F 310 can also perform the wireless communication conforming to the communication standard such as Wi-Fi Direct. The Wi-Fi communication standard corresponds to a first wireless communication method.

The second wireless communication I/F 320 is an interface that includes a wireless antenna and an interface circuit and performs wireless communication with an external device including the connection device 100. The second wireless communication I/F 320 corresponds to a second wireless communication unit.

The second wireless communication I/F 320 according to the embodiment performs short distance wireless communication according to a communication method corresponding to a communication standard such as Bluetooth Low Energy (BLE). The second wireless communication I/F 320 may perform the short distance wireless communication such as Bluetooth and Zigbee. Bluetooth and Zigbee are registered trademark. The communication method corresponding to the BLE communication standard corresponds to a second wireless communication method.

The operation unit 330 includes hardware buttons and receives an operation of a user.

The hardware buttons of the operation unit 330 include, for example, a button for volume adjustment and a power button for turning on and off power of the information processing device 300.

The touch panel 340 includes a display panel and a touch sensor. The display panel and the touch sensor are not shown.

As the display panel, for example, a liquid crystal panel or an organic electro-luminescence (EL) panel is used.

The touch sensor detects a touch operation on the display panel. The touch sensor detects a position of the display panel touched by an indicator such as an electronic pen or a user's finger as the touch operation. The touch sensor outputs, to the control unit 350, an operation signal including coordinate information indicating the position of the display panel where the touch operation is detected. In the embodiment, a case where the indicator is the user's finger will be described.

The operation unit 330 and the touch panel 340 correspond to a reception unit. In the embodiment, a case where the touch panel 340 is operated as the reception unit will be described.

The control unit 350 is a computer device including a storage unit 360 and a processor 370.

The storage unit 360 includes, for example, a random access memory (RAM) and a read only memory (ROM).

The RAM is used as a calculation region of the processor 370.

The ROM stores an OS 361 for controlling operations of the information processing device 300, an application program 363, and various types of setting information. Hereinafter, the application program is referred to as APP or application. The APP 363 is an application that causes the information processing device 300 to function as a remote controller and controls the scanner 100A and the printer 100B by the information processing device 300. The APP 363 has a function of an in-application browser and a function of accessing a website in the application without starting a Web browser.

The processor 370 is an arithmetic processing device including a processor such as a central processing unit (CPU) or a micro-processing unit (MPU). The processor 370 may be implemented by a single processor, or may be implemented by a plurality of processors. The processor 370 may be implemented by an SoC integrated with part or all of the storage unit 360 or other circuits. In addition, the processor 370 may be implemented by a combination of a CPU that executes a program and a digital signal processor (DSP) that executes a predetermined arithmetic process.

3. Operation of Information Processing Device

FIGS. 3 to 6 are diagrams showing examples of an application screen 400. The application screen 400 is a display screen displayed on the touch panel 340 when the processor 370 executes the APP 363. When the APP 363 is selected, the control unit 350 executes the APP 363 to display the application screen 400 on the touch panel 340.

Figure 3:
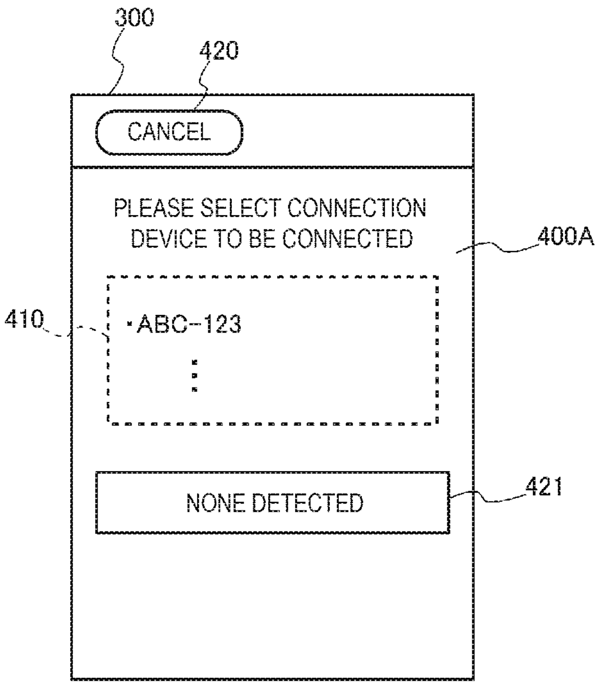
FIG. 3 is a diagram showing an example of an application screen.

The control unit 350 that executes the APP 363 first performs the BLE communication using the second wireless communication I/F 320 to detect the connection device 100 capable of performing the BLE communication. The control unit 350 acquires identification information of the connection device 100 from the detected connection device 100. The control unit 350 displays a list of identification information of the detected connection device 100 on the application screen 400. FIG. 3 shows an application screen 400A on which the identification information of the connection device 100 of which the identification information is acquired is displayed.

A none-detected button 421, a cancel button 420, and the like are displayed on the application screen 400A in addition to a display field 410 displaying the list of identification information of the connection device 100.

The user refers to the application screen 400A and determines whether the identification information of the connection device 100 to be connected is displayed on the display field 410.

When the identification information of the connection device 100 to be connected is displayed on the display field 410, the user taps the identification information of the connection device 100 to be connected to select the identification information of the connection device 100 to be connected.

When the identification information of the connection device 100 is tapped and selected, the control unit 350 displays, for example, the application screen 400 on which a password for connecting to the wireless network 15 constructed by the wireless router 10 can be input. This application screen 400 is not shown.

When the password is input to the application screen 400, the control unit 350 transmits an SSID of the wireless network 15 and the input password to the selected connection device 100. The SSID of the wireless network 15 is in a state in which the information processing device 300 completes the connection to the wireless network 15 and acquisition of the SSID of the wireless network 15. Accordingly, the connection device 100 is connected to the wireless network 15, and the application screen 400 on which functions provided by the connection device 100 can be operated is displayed.

Next, a case in which the identification information of the connection device 100 to be connected is not displayed on the display field 410, that is, a case in which the connection device 100 does not have a function of the wireless communication based on the BLE will be described.

When the identification information of the connection device 100 to be connected is not displayed on the display field 410, the user presses the none-detected button 421 shown on the application screen 400A of FIG. 3. The none-detected button 421 is a button to be pressed when the connection device 100 to be connected is not displayed on the display field 410. In the case of the embodiment, when the connection device 100 is a type of device that does not have the communication function based on the BLE, the identification information of the connection device 100 is not displayed on the display field 410.

When the none-detected button 421 is pressed, the control unit 350 displays the application screen 400 for receiving an input of the identification information of the connection device 100 to be connected to the information processing device 300 by the user. The application screen 400 is not shown. The identification information is, for example, a device type name of the connection device 100.

After the identification information of the connection device 100 is input to the application screen 400, the control unit 350 displays the application screen 400 for selecting a method for connecting to the connection device 100 whose identification information is input. The connection method includes a connection implemented by an infrastructure mode and a connection implemented by the Wi-Fi Direct.

The connection method implemented by the infrastructure mode is a connection method of connecting the connection device 100 to the wireless network 15 constructed by the wireless router 10 and transmitting and receiving data to and from the information processing device 300 connected to the same wireless network 15.

The connection implemented by the Wi-Fi Direct is a connection method of operating the connection device 100 as an access point and directly connecting the connection device 100 and the information processing device 300.

Figure 4:
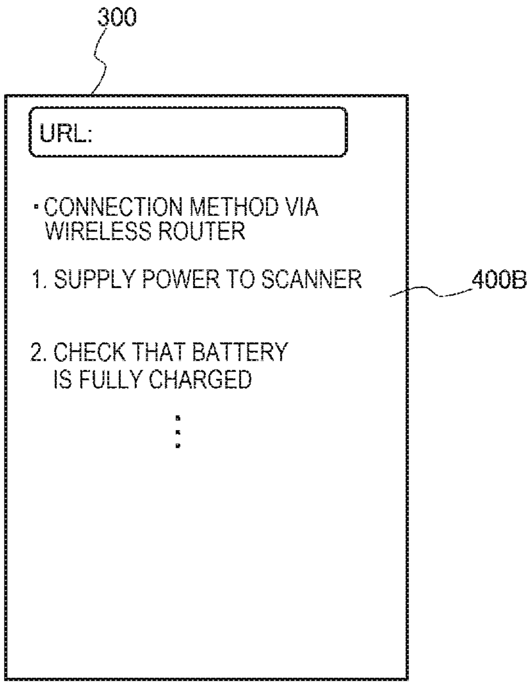
FIG. 4 is a diagram showing an example of the application screen.

When the selection of the connection method is received, the control unit 350 accesses a website describing an operation method of the connection device 100 for connecting the connection device 100 by the received connection method. The control unit 350 that executes the APP 363 accesses the website provided by the server device 200 using the identification information as a search key by the function of the in-application browser. Then, the control unit 350 displays a web page provided by the server device 200 on an application screen 400B. The web page is a page for describing an operation method related to the connection to the connection device 100 corresponding to the identification information. FIG. 4 is a diagram showing the application screen 400B on which the web page is displayed for describing an operation method related to the connection to the connection device 100. The web page shown in FIG. 4 corresponds to a web page related to settings of the wireless communication of the first wireless communication method.

The user operates the connection device 100 while viewing the web page displayed on the application screen 400, so as to set the connection device 100. For example, when the connection method is the connection implemented by the infrastructure mode, an operation of setting an operation mode of the connection device 100 to the infrastructure mode and an operation of inputting connection information, or the like, for connecting to the wireless network 15 constructed by the wireless router 10 are included. In addition, when the connection method is the connection implemented by the Wi-Fi Direct, an operation of setting the operation mode of the connection device 100 to a Wi-Fi Direct mode and an operation of displaying an SSID or a password for the connection implemented by the Wi-Fi Direct on a display unit included in the connection device 100 are included.

When the infrastructure mode is selected as the operation mode of the connection device 100, the connection device 100 is in a state of being connected to the wireless network 15 constructed by the wireless router 10 based on the information input by the user.

When the Wi-Fi Direct is selected as the operation mode of the connection device 100, the connection device 100 is in a state of capable of being connected by the Wi-Fi Direct.

Next, the control unit 350 determines whether the web page displayed on the application screen 400 is closed. When the web page is closed, the control unit 350 determines that the user operates the connection device 100 and the setting of the connection device 100 is completed.

When the operation of closing the web page is received from the touch panel 340, the control unit 350 determines whether a URL of the closed Web page includes the identification information of the connection device 100. The identification information of the connection device 100 may be identification information input by the user when accessing the website, or may be stored in the storage unit 360 in advance.

When the URL of the closed web page includes the identification information of the connection device 100, the control unit 350 acquires the identification information. Next, when the method for connecting to the connection device 100 is the connection implemented by the infrastructure mode, the control unit 350 detects the connection device 100 that is connected to the wireless network 15 and whose identification information matches the acquired identification information.

Figure 5:
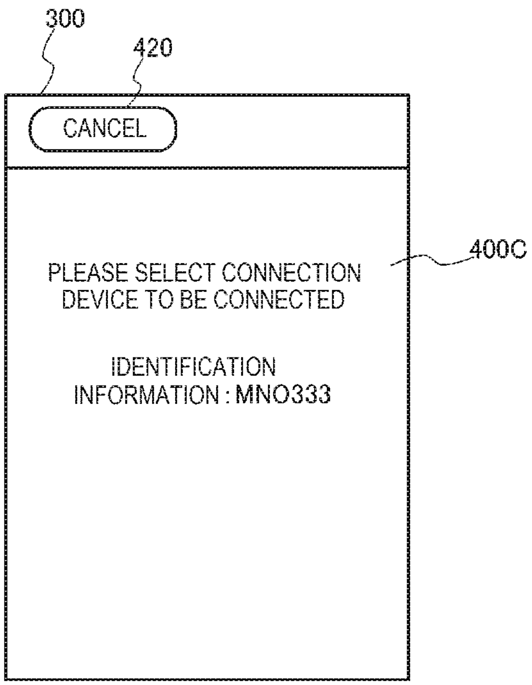
FIG. 5 is a diagram showing an example of the application screen.

When the connection device 100 whose identification information matches the acquired identification information is detected, the control unit 350 displays the identification information on the application screen 400C. An example of the application screen 400C is shown in FIG. 5.

When the method for connecting to the connection device 100 is the connection implemented by the Wi-Fi Direct, the control unit 350 functions as an access point and detects the connection device 100 whose identification information matches the acquired identification information.

When the connection device 100 whose identification information matches the acquired identification information is detected, the control unit 350 displays the identification information on the application screen 400C.

The user checks whether the identification information displayed on the application screen 400C matches the identification information of the connection device 100 to be connected, and taps the identification information of the connection device 100 displayed on the application screen 400C when the above pieces of identification information match with each other.

When the identification information is selected by the user, the control unit 350 wirelessly connects to the selected connection device 100.

In the related art, when the connection device 100 not having the function of the short distance wireless communication such as the BLE is connected to the information processing device 300, first, a web page for describing the operation method of the connection device 100 is displayed on the application screen 400B. Thereafter, the user operates the connection device 100 to input the setting information, and then the following operation is further required.

The user first remembers an operation procedure displayed on the web page, closes the web page, and then displays the predetermined application screen 400. The application screen 400 is a screen on which an operation of selecting the connection device 100 to be connected and an operation of connecting the connection device 100 for which a Wi-Fi setting is completed to the information processing device 300 can be performed.

After the predetermined application screen 400 is displayed, the user performs inputs for operation of selecting the connection device 100 to be connected and the operation of connecting the connection device 100 for which the Wi-Fi setting is completed to the information processing device 300.

Figure 6:
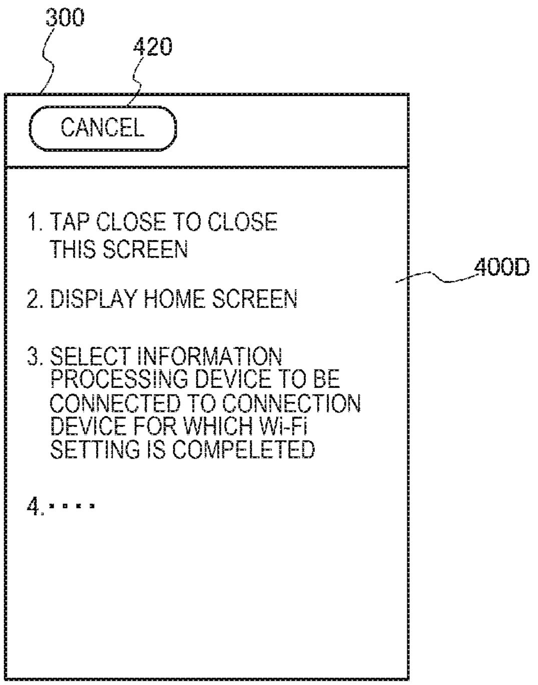
FIG. 6 is a diagram showing an example of the application screen.

FIG. 6 is a diagram showing an application screen 400D.

When the identification information of the connection device 100 cannot be acquired from the URL of the web page, the control unit 350 displays the application screen 400D shown in FIG. 6 on the touch panel 340.

The application screen 400D displays an operation method for wirelessly connecting the information processing device 300 and the connection device 100 by the first wireless communication method. The user checks the display of the application screen 400D, closes the application screen 400D, and inputs, to the application screen 400, the identification information of the connection device 100 and a setting of the wireless communication method with the connection device 100.

Figure 7:
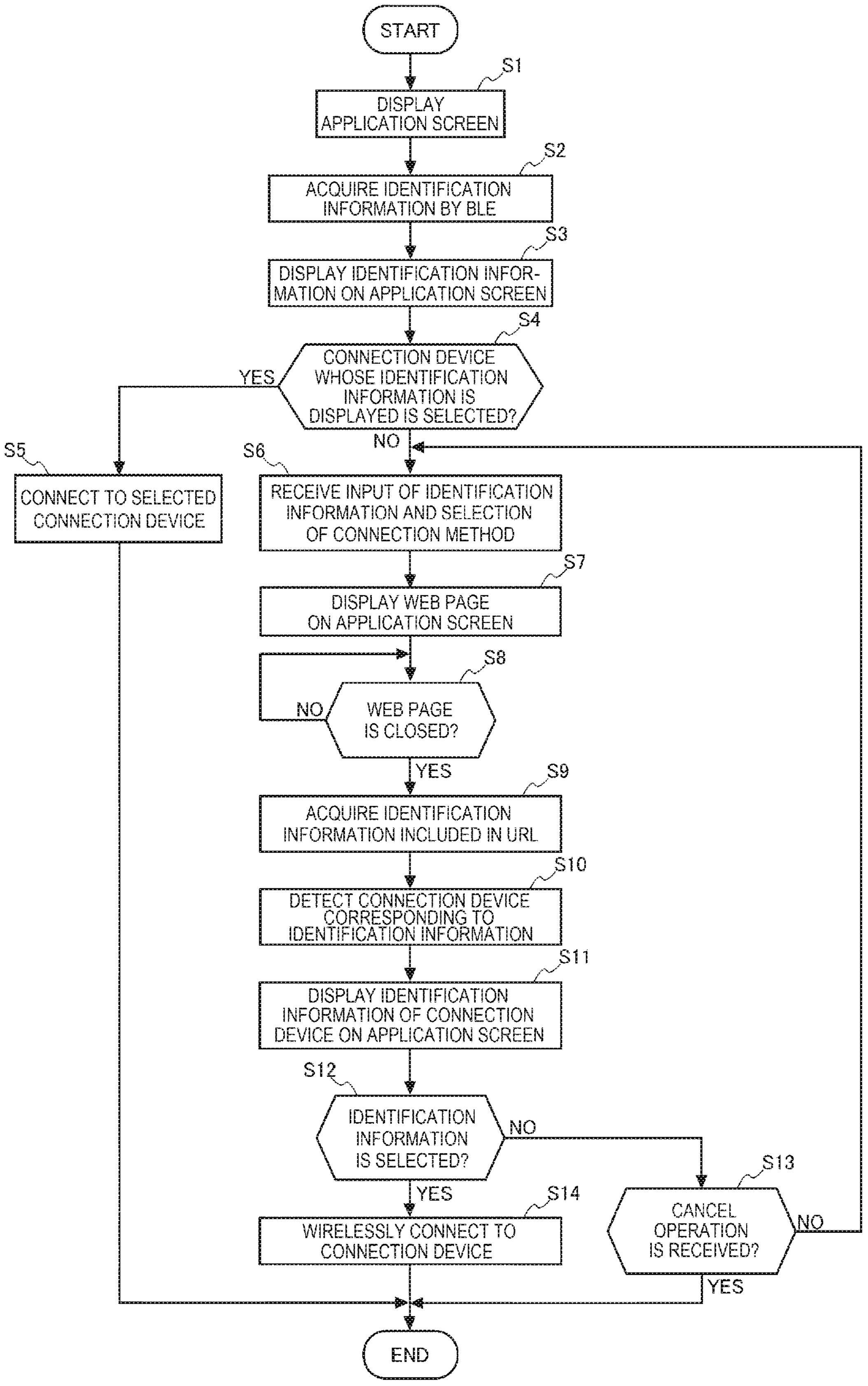
FIG. 7 is a flowchart showing operations of the information processing device.

FIG. 7 is a flowchart showing operations of the information processing device 300.

The operations of the information processing device 300 will be described with reference to the flowchart shown in FIG. 7.

When the APP 363 is selected, the control unit 350 executes the selected APP 363 to display the application screen 400 on the touch panel 340 (step S1). Next, the control unit 350 performs the BLE communication using the second wireless communication I/F 320, detects the connection device 100 capable of performing the BLE communication, and acquires the identification information of the connection device 100 from the detected connection device 100 (step S2). The control unit 350 displays the application screen 400A on which the acquired identification information of the connection device 100 is displayed (step S3).

Next, the control unit 350 determines whether the identification information of the connection device 100 displayed on the application screen 400A is selected by tapping the identification information (step S4). When the identification information of the connection device 100 displayed on the application screen 400A is selected (step S4/YES), the control unit 350 wirelessly connects to the selected connection device 100 (step S5). Specifically, the control unit 350 displays the application screen 400 on which a password for connecting to the wireless network 15 can be input. When the password is received, the control unit 350 transmits the SSID of the wireless network 15 and the received password to the selected connection device 100, and wirelessly connects to the selected connection device 100.

When the none-detected button 421 is pressed instead of the identification information of the connection device 100 displayed on the application screen 400A, the control unit 350 determines that the identification information of the connection device 100 is not selected (step S4/NO). In this case, the control unit 350 displays the application screen 400 for receiving the identification information of the connection device 100 and the selection of the method for connecting to the connection device 100, and receives the identification information of the connection device 100 and the method for connecting to the connection device 100 (step S6).

Next, the control unit 350 accesses the web page of the website provided by the server device 200 using the identification information as a search key by the function of the in-application browser, and displays the web page on the application screen 400B (step S7). The web page shows the method of operating the connection device 100 shown in FIG. 4.

Next, the control unit 350 determines whether the operation of closing the Web page displayed on the application screen 400B is received (step S8). When the operation of closing the web page is not received (step S8/NO), the control unit 350 waits until the operation of closing the web page is received.

When the operation of closing the web page is received (step S8/YES), the control unit 350 acquires the identification information included in the URL of the web page (step S9).

Next, the control unit 350 detects the connection device 100 whose identification information matches the acquired identification information (step S10). When the method for connecting to the connection device 100 selected in step S6 is the connection implemented by the infrastructure mode, the control unit 350 detects the connection device 100 that is connected to the wireless network 15 and whose identification information matches the acquired identification information. When the connection device 100 whose identification information matches the acquired identification information is detected, the control unit 350 displays the identification information on the application screen 400C (step S11).

When the method for connecting to the connection device 100 is the connection implemented by the Wi-Fi Direct, the control unit 350 functions as an access point and detects the connection device 100 whose identification information matches the acquired identification information. When the connection device 100 whose identification information matches the acquired identification information is detected, the control unit 350 displays the identification information on the application screen 400C (step S11).

Next, the control unit 350 determines whether the identification information of the connection device 100 displayed on the application screen 400C is selected (step S12). When the identification information of the connection device 100 is not selected (step S12/NO) and the cancel button 420 is pressed (step S13/YES), the control unit 350 deletes the application screen 400C from the touch panel 340. Then, the control unit 350 displays the application screen 400 for receiving the input of the identification information of the connection device 100 (step S6).

In addition, when the identification information of the connection device 100 displayed on the application screen 400C is selected (step S12/YES), the control unit 350 wirelessly connects to the selected connection device 100 (step S13).

4. Summary of Present Disclosure

Hereinafter, a summary of the present disclosure will be added.

APPENDIX 1

An information processing device including:

a first wireless communication unit configured to perform wireless communication of a first wireless communication method;

a display unit;

a reception unit configured to receive an operation; and a control unit configured to execute an application program for controlling a connection device, in which the control unit is configured to cause the display unit to display, based on identification information of a connection device received by the reception unit, a web page related to a setting of the connection device corresponding to the identification information and related to a setting of wireless communication of the first wireless communication method, acquire the identification information of the connection device included in the web page, and display the identification information of the connection device on an application screen displayed by the application program, when the identification information displayed on the application screen is selected, detect the connection device corresponding to the identification information, and wirelessly connect to the connection device by the first wireless communication method.

According to this configuration, by displaying the web page on the display unit, it is determined that the user visually recognizes the web page and sets the wireless communication of the first wireless communication method to the connection device, and the identification information of the connection device is acquired. When the identification information displayed on the application screen is selected, the control unit detects the connection device corresponding to the identification information, and wirelessly connects to the connection device using the first wireless communication method. Accordingly, the operation of displaying the identification information of the connection device on the application screen can be simplified, and convenience for the user can be improved.

APPENDIX 2

The information processing device according to Appendix 1, in which the control unit is configured to cause the display unit to display the web page by a function of a web browser included in the application program, and acquire the identification information of the connection device included in the web page.

According to this configuration, it is possible to acquire the identification information of the connection device included in the web page by displaying the web page using the function of the web browser included in the application program.

APPENDIX 3

The information processing device according to Appendix 1 or 2, in which when an operation of closing the web page is received by the reception unit, the control unit acquires identification information included in the web page and displays the identification information on the application screen.

According to this configuration, by receiving the operation of closing the web page, it is possible to determine that the user visually recognizes the web page and performs the setting related to the wireless communication of the first wireless communication method on the connection device.

APPENDIX 4

The information processing device according to any one of Appendixes 1 to 3, in which the control unit acquires the identification information of the connection device from a uniform resource locator (URL) of the web page.

According to this configuration, the identification information of the connection device is easily acquired by acquiring the identification information of the connection device from the URL always included in the web page.

APPENDIX 5

The information processing device according to Appendix 4, in which when the identification information of the connection device cannot be acquired from the URL of the web page, the control unit displays, as the application screen, a screen for describing an operation method for wirelessly connecting the information processing device and the connection device to each other by the first wireless communication method, by an operation of the application screen.

According to this configuration, when the identification information of the connection device cannot be acquired from the URL of the web page, by the operation of the application screen, the screen for describing the operation method for wirelessly connecting the information processing device and the connection device to each other by the first wireless communication method is displayed as the application screen. Therefore, the user can check the method of wirelessly connecting the information processing device and the connection device by the first wireless communication method on the application screen.

APPENDIX 6

The information processing device according to any one of Appendixes 1 to 5, further including:

a second wireless communication unit configured to perform wireless communication of a second wireless communication method, in which when the connection device corresponds to wireless communication of the second wireless communication method, the control unit transmits connection information for wirelessly connection by the first wireless communication method to the connection device by the second wireless communication unit, and wirelessly connects to the connection device by the first wireless communication method.

According to this configuration, when the connection device corresponds to the wireless communication of the second wireless communication method, the information processing device and the connection device can be wirelessly connected to each other by the first wireless communication method using the wireless communication of the second wireless communication method.

APPENDIX 7

The information processing device according to any one of Appendixes 1 to 6, in which the first wireless communication method performed by the first wireless communication unit is wireless communication conforming to a Wi-Fi standard, and the control unit wirelessly connects to the connection device by infrastructure mode or Wi-Fi Direct.

According to this configuration, the information processing device and the connection device can be wirelessly connected to each other by the infrastructure mode or Wi-Fi Direct.

APPENDIX 8

A control method of an information processing device, the information processing device including a first wireless communication unit configured to perform wireless communication of a first wireless communication method, a display unit, a reception unit, and a control unit configured to execute an application program, the control method including:

causing the display unit to display, based on identification information of a connection device received by the reception unit, a web page related to a setting of the connection device corresponding to the identification information and related to a setting of wireless communication of the first wireless communication method;

acquiring the identification information of the connection device included in the web page; and displaying the identification information of the connection device on an application screen displayed by the application program, when the identification information displayed on the application screen is selected, detecting the connection device corresponding to the identification information, and wirelessly connecting to the connection device by the first wireless communication method.

According to this configuration, by displaying the web page on the display unit, it is determined that the user visually recognizes the web page and sets the wireless communication of the first wireless communication method to the connection device, and the identification information of the connection device is acquired. When the identification information displayed on the application screen is selected, the control unit detects the connection device corresponding to the identification information, and wirelessly connects to the connection device using the first wireless communication method. Accordingly, the operation of displaying the identification information of the connection device on the application screen can be simplified, and convenience for the user can be improved.

APPENDIX 9

A non-transitory computer-readable storage medium storing a program, the program being executed by an information processing device including a first wireless communication unit configured to perform wireless communication of a first wireless communication method, a display unit, a reception unit, and a control unit configured to execute an application program, the program including:

a procedure of causing the display unit to display, based on identification information of a connection device received by the reception unit, a web page related to a setting of the connection device corresponding to the identification information and related to a setting of wireless communication of the first wireless communication method;

a procedure of acquiring the identification information of the connection device included in the web page; and a procedure of displaying the identification information of the connection device on an application screen displayed by the application program, when the identification information displayed on the application screen is selected, detecting the connection device corresponding to the identification information, and wirelessly connecting to the connection device by the first wireless communication method.

According to this configuration, by displaying the web page on the display unit, it is determined that the user visually recognizes the web page and sets the wireless communication of the first wireless communication method to the connection device, and the identification information of the connection device is acquired. When the identification information displayed on the application screen is selected, the control unit detects the connection device corresponding to the identification information, and wirelessly connects to the connection device using the first wireless communication method. Accordingly, the operation of displaying the identification information of the connection device on the application screen can be simplified, and convenience for the user can be improved.

5. Other Configurations

The embodiment described above is a preferred embodiment of the present disclosure. However, the present disclosure is not limited to the above embodiment, and various modifications can be made without departing from the scope of the present disclosure. For example, the wireless communication method of the first wireless communication I/F 310 is not limited to the Wi-Fi, and the wireless communication method of the second wireless communication I/F 320 is not limited to the BLE. For example, the wireless communication method of the first wireless communication I/F 310 may be wireless communication performed by the user directly specifying an IP address.

Further, the present disclosure is also applicable to a case where the information processing device 300 is a computer device such as a notebook PC and the connection device 100 is compatible with only wired connection.

In the embodiment, the case where the identification information is acquired from the URL included in the web page is described, but an acquisition location of the identification information is not limited to the URL as long as the identification information can be acquired.

Figure 2:
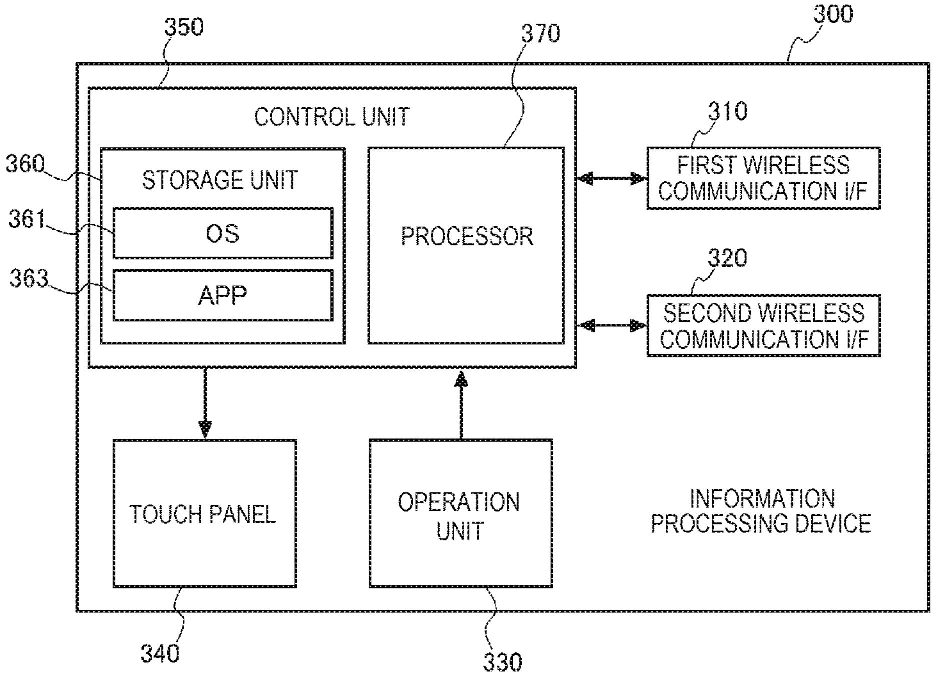
FIG. 2 is a block diagram showing a configuration of an information processing device.

Each functional unit of the information processing device 300 shown in FIG. 2 shows a functional configuration, and a specific implementation form is not particularly limited. That is, it is not always necessary to implement hardware individually corresponding to each functional unit, and it is also of course possible to adopt a configuration in which the functions of a plurality of functional units are implemented by one processor executing a program. A part of the functions implemented by software in the above-described embodiment may be implemented by hardware, or a part of the functions implemented by hardware may be implemented by software. In addition, specific detailed configurations of other units of the information processing device 300 can be freely changed without departing from the spirit of the present disclosure.

A processing unit of the flowchart shown in FIG. 7 is divided according to a main processing content in order to facilitate understanding of the processes of the information processing device 300. The present disclosure is not limited by a method and name of dividing the processing unit shown in the flowchart of FIG. 7. Further, the processes of the information processing device 300 can also be divided into more processing units depending on processing contents, and can also be divided such that one processing unit includes more processes. Further, a processing order of the above flowchart is not limited to the shown example.

In addition, when the control method and the program of the information processing device 300 are implemented by the computer included in the information processing device 300, the program to be executed by the computer may be implemented as a recording medium or a transmission medium for transmitting the program. As the recording medium, a magnetic or optical recording medium or a semiconductor memory device can be used. Examples of the recording medium specifically include portable or fixed recording media such as a flexible disk, a Hard Disk Drive (HDD), a CD-ROM, a DVD, a Blu-ray disc, a magneto-optical disk, a flash memory, and a card-type recording medium. The recording medium may be a non-volatile storage device such as a RAM, a ROM, or an HDD, which is an internal storage device included in the server device. Blu-ray is a registered trademark.

What is claimed is:

1. An information processing device comprising:

a first wireless communication unit configured to perform wireless communication of a first wireless communication method;

a display unit;

a reception unit configured to receive an operation; and a control unit configured to execute an application program for controlling a target connection device, wherein the control unit is configured to cause the display unit to display, based on identification information of a connection device received by the reception unit, a web page related to a setting of the connection device corresponding to the identification information and related to a setting of wireless communication of the first wireless communication method, acquire a identification information of the connection device included in the web page, and display the identification information of the connection device on an application screen displayed by the application program, when the identification information displayed on the application screen is selected, detect the connection device corresponding to the identification information, and wirelessly connect to the connection device by the first wireless communication method, the control unit acquires the identification information of the connection device from a uniform resource locator (URL) of the web page, and when the identification information of the connection device is not acquired from the URL of the web page, the control unit displays, as the application screen, a screen for describing an operation method for wirelessly connecting the information processing device and the target connection device to each other by the first wireless communication method, by an operation of the application screen.

2. The information processing device according to claim 1, wherein the control unit is configured to cause the display unit to display the web page by a function of a web browser included in the application program.

3. The information processing device according to claim 1, wherein when an operation of closing the web page is received by the reception unit, the control unit acquires the identification information included in the web page and displays the identification information on the application screen.

4. The information processing device according to claim 1, further comprising:

a second wireless communication unit configured to perform wireless communication of a second wireless communication method, wherein when the connection device corresponds to wireless communication of the second wireless communication method, the control unit transmits connection information for wirelessly connection by the first wireless communication method to the connection device by the second wireless communication unit, and wirelessly connects to the connection device by the first wireless communication method.

5. The information processing device according to claim 1, wherein the first wireless communication method performed by the first wireless communication unit is wireless communication conforming to a Wi-Fi standard, and the control unit wirelessly connects to the connection device by an infrastructure mode or Wi-Fi Direct.

6. A control method of an information processing device, the information processing device including a first wireless communication unit configured to perform wireless communication of a first wireless communication method, the information processing device further including a display unit, a reception unit, and a control unit configured to execute an application program, the control method comprising:

causing the display unit to display, based on identification information of a connection device received by the reception unit, a web page related to a setting of the connection device corresponding to the identification information and related to a setting of wireless communication of the first wireless communication method;

acquiring the identification information of the connection device included in the web page; and displaying the identification information of the connection device on an application screen displayed by the application program, when the identification information displayed on the application screen is selected, detecting the connection device corresponding to the identification information, and wirelessly connecting to the connection device by the first wireless communication method, the control unit acquires the identification information of the connection device from a uniform resource locator (URL) of the web page, and when the identification information of the connection device is not acquired from the URL of the web page, the control unit displays, as the application screen, a screen for describing an operation method for wirelessly connecting the information processing device and the connection device to each other by the first wireless communication method, by an operation of the application screen.

7. A non-transitory computer-readable storage medium storing a program, the program being executed by an information processing device including a first wireless communication unit configured to perform wireless communication of a first wireless communication method, the information processing device further including a display unit, a reception unit, and a control unit configured to execute an application program, the program comprising:

a procedure of causing the display unit to display, based on identification information of a connection device received by the reception unit, a web page related to a setting of the connection device corresponding to the identification information and related to a setting of wireless communication of the first wireless communication method;

a procedure of acquiring the identification information of the connection device included in the web page; and a procedure of displaying the identification information of the connection device on an application screen displayed by the application program, when the identification information displayed on the application screen is selected, detecting the connection device corresponding to the identification information, and wirelessly connecting to the connection device by the first wireless communication method using the first wireless communication unit, the control unit acquires the identification information of the connection device from a uniform resource locator (URL) of the web page, and when the identification information of the connection device is not acquired from the URL of the web page, the control unit displays, as the application screen, a screen for describing an operation method for wirelessly connecting the information processing device and the connection device to each other by the first wireless communication method, by an operation of the application screen.

* * * * *